Patented Aug. 16, 1932

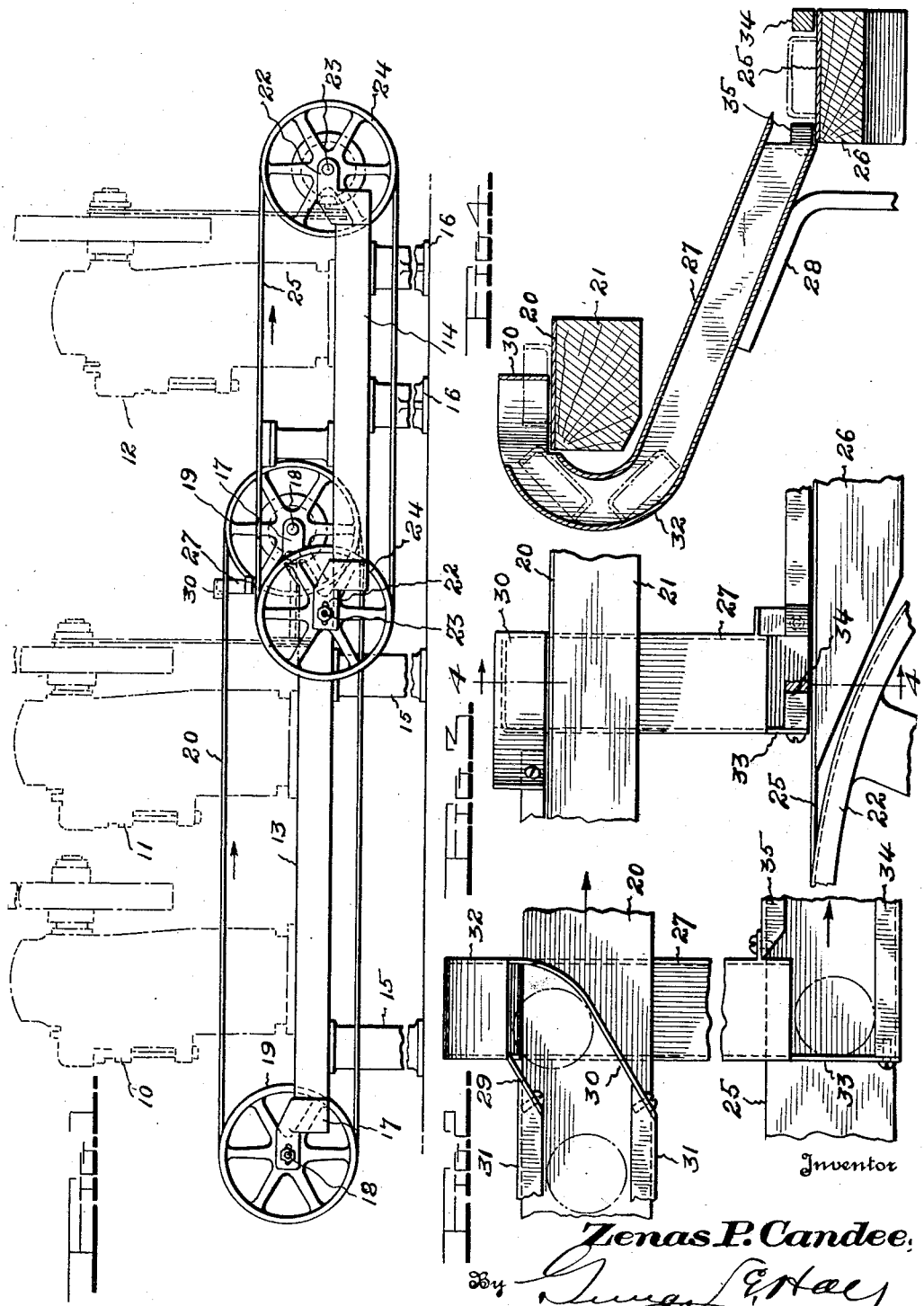

1,872,402

UNITED STATES PATENT OFFICE

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT

TRANSFER MECHANISM

Original application filed January 2, 1930, Serial No. 418,028. Patent No. 1,805,976. Divided and this application filed January 26, 1931. Serial No. 511,327.

My invention relates to new and useful improvements in transfer mechanisms and is designed for the purpose of transferring workpieces from a conveyor belt or the like to a delivery station in a position reverse of that occupied by it on the conveyor belt.

To these, and other ends, my invention consists in the transfer mechanism, having certain details of construction and combinations of parts, as will be hereinafter described and more particularly pointed out in the claims. This application is a division of my prior application Serial No. 418,028, namely Patent No. 1,805,976.

Referring to the drawing, in which like numerals of reference designate like parts in the several figures;

Figure 1 is a side view of my transfer mechanism as associated with fabricating tools;

Figure 2 is a fragmentary detail plan view thereof;

Figure 3 is a front view of the parts shown in Figure 2; and

Figure 4 is a transverse sectional view thereof, taken generally upon line 4—4 of Figure 3.

In the drawing, which discloses one embodiment of my invention, I show in broken lines the outline of three presses of the same general type, and severally designated 10, 11 and 12, which may be of any preferred or conventional form. These presses are mounted upon tables 13 and 14, supported by legs 15 and 16. Machines other than presses may, of course, be associated with my mechanism, as may seem most desirable.

At each end of the table 13 is a bracket 17, supporting a shaft 18, upon which is rotatably mounted a pulley 19. These pulleys are connected by a conveyor belt 20, the upper portion of which may be supported by a suitable platform 21 and travels in the direction indicated by the arrow.

A bracket 22 is fixed at each end of the table 14 and supports a shaft 23, upon which is rotatably mounted a pulley 24. These pulleys are connected by the belt 25, which may be supported by a suitable platform 26 and travel in the direction indicated by the arrow.

As shown, the operation to be performed upon the workpieces by the press 12 necessitates the same being in a position the reverse of that while on the belt 20.

This invention relates largely to the mechanism for performing this reverse and delivery operation. The mechanism therefor consists in part of a boxlike chute 27 partially supported by a bracket 28, the upper end of which is curved at 32 and the side walls are curved and project across the top of the belt 20 to form the guide walls 29 and 30, between which the workpieces are guided toward the open end of the chute 27 under the influence of the belt passing thereunder.

The walls 29 and 30 terminate in flanges 31, which form guides for the workpieces adjacent to the point of deflection from the belt.

As so positioned, the open upper end of the chute is opposite one side of the belt and the top of the adjacent lower wall of the curved portion is in substantially the same plane as the belt, as shown in Figure 4.

The workpiece on the top of the belt 20 is carried laterally of the direction of movement thereof by the curved wall 30 under the friction of the moving belt until the center of gravity is beyond the edge of the belt, when it tips over and falls into the mouth of chute 27 at the curved portion 32 thereof. The passage of the article through the curved portion and the remainder of the chute reverses its position as it slides down toward and onto the belt 25. Four of the various positions of one form of the workpiece during its progress on the belt 20 to the belt 25 are shown in Figure 4, which illustrates its path of movement.

One of the side walls of the chute is extended at 33 across the belt 25 and is connected with a guide flange 34 and upon the opposite side of the belt is a similar guide flange 35, between which the workpieces travel away from the chute.

The prior art differs from the above disclosure in that the work piece is presented to the chute with its axis substantially parallel with the bottom thereof, and by means of devices within the chute, such as wires, irregularly shaped bottoms, and other devices, turn it around until its axis is at substantially a right angle to the bottom of the chute.

What I claim as new and desire to secure by Letters Patent, is:

1. In a transfer mechanism, a movable conveyor belt, a delivery conveyor belt below the plane of the first belt and means for transferring work from the movable conveyor belt to the delivery conveyor belt and during such transfer, turning the work so that it will be delivered to the delivery conveyor belt in a position the reverse of its former position when on the movable conveyor belt, the axis of the work upon both belts being in approximately the same plane, including a chute having top, bottom, and side walls disposed transversely of the line of flight of the belts and having an angular mouth which reflects work from the first belt transversely thereof and under the influence of gravity into the chute, having an outlet for discharging the work onto the delivery belt and terminating adjacent one side of the latter, one side wall of the chute being continued beyond the outlet end thereof and extending transversely across the delivery belt, a guide member connected to the opposite side wall adjacent the outlet end of the chute and extending at substantially a right angle to said side wall, and a guide member carried by said wall extension and extending substantially parallel to the sides of said belt, the side wall extension preventing movement of the work longitudinally of the delivery belt excepting in the direction of the line of flight of the delivery belt and said guide members preventing movement of the work transversely of the line of flight of the delivery belt and outwardly beyond the same.

2. In mechanism for transferring an article from the upper of two conveyer belts to the lower of said conveyer belts, which are arranged substantially parallel with each other, comprising a chute, one wall of which terminates adjacent to one edge of the upper of said conveyer belts and another wall which extends beyond the aforesaid wall and projects over the belt, whereby an article on the belt will be deflected laterally on the belt until it projects over the end of the first mentioned wall a sufficient distance to be influenced by gravity and thereby tipped by reason of its own weight into the open mouth end of said chute, which is formed below its mouth so that during its flight downward through the chute it is prevented from assuming its former position and guided by the walls thereof so that when delivered to the lower of the two conveyer belts it is in a position the reverse of its former position when on the upper of said conveyer belts, the axis of the article, however, on both belts being in the same plane, said chute at its outlet end having one wall thereof extending transversely across the delivery belt and an arm connected to the opposite side wall extending at substantially a right angle to said side walls, and a guide member carried by said wall extension and said arm and extending substantially parallel to the sides of the belt whereby to prevent the article from passing over the belt and guiding it in its path thereon.

In testimony whereof, I have hereunto affixed my signature.

ZENAS P. CANDEE.